(12) United States Patent
VanBree

(10) Patent No.: US 9,787,882 B1
(45) Date of Patent: Oct. 10, 2017

(54) SYSTEM FOR GENERATING AND DISPLAYING DISCONTINUOUS TIME-LAPSE IMAGE SEQUENCES

(71) Applicant: Kenneth Arie VanBree, Mountain View, CA (US)

(72) Inventor: Kenneth Arie VanBree, Mountain View, CA (US)

( * ) Notice: Subject to any disclaimer, the term of this patent is extended or adjusted under 35 U.S.C. 154(b) by 107 days.

(21) Appl. No.: 14/725,019

(22) Filed: May 29, 2015

Related U.S. Application Data

(60) Provisional application No. 62/005,832, filed on May 30, 2014.

(51) Int. Cl.
| | |
|---|---|
| H04N 5/225 | (2006.01) |
| H04N 5/232 | (2006.01) |
| G03B 37/02 | (2006.01) |
| G01B 11/24 | (2006.01) |
| H04N 7/18 | (2006.01) |

(52) U.S. Cl.
CPC ........... *H04N 5/2252* (2013.01); *G01B 11/24* (2013.01); *G03B 37/02* (2013.01); *H04N 5/2253* (2013.01); *H04N 5/23296* (2013.01); *H04N 7/183* (2013.01)

(58) Field of Classification Search
CPC .. H04N 5/23238; H04N 5/2252; G03B 37/00; G03B 37/02; G01B 11/24
USPC ..................................... 348/36, 37, 135, 142
See application file for complete search history.

(56) References Cited

U.S. PATENT DOCUMENTS

| | | | | | |
|---|---|---|---|---|---|
| 7,688,381 | B2 * | 3/2010 | VanBree | ................ | H04N 5/222 348/207.11 |
| 7,966,563 | B2 * | 6/2011 | VanBree | ................... | G06T 5/50 715/713 |
| 8,294,814 | B2 * | 10/2012 | VanBree | ................ | H04N 5/222 348/207.11 |
| 9,025,861 | B2 * | 5/2015 | Furukawa | ............... | G06T 17/00 382/154 |
| 9,460,517 | B2 * | 10/2016 | Fathi | ......................... | G06T 7/97 |
| 2004/0201756 | A1 * | 10/2004 | VanBree | ................ | H04N 5/222 348/239 |
| 2010/0177160 | A1 * | 7/2010 | Tocher | ................... | G02B 13/06 348/36 |
| 2011/0214085 | A1 * | 9/2011 | Vanbree | .................... | G06T 5/50 715/781 |

(Continued)

FOREIGN PATENT DOCUMENTS

| | | | | |
|---|---|---|---|---|
| JP | 2005020559 | A | * | 1/2005 |
| JP | 2005122378 | A | * | 5/2005 |

(Continued)

*Primary Examiner* — John Villecco

(57) ABSTRACT

The invention provides a method and an apparatus for use with an imaging device weighing less than eight ounces, such as a lightweight digital camera or a camera-equipped cell phone, in conjunction with a base apparatus capable of locating and re-locate the imaging device relative to a built environment, and generating and displaying discontinuous time-lapse image sequences. The inventive apparatus provides for the rotation of the attached imaging device to capture a set of images that provide complete coverage of the items and features that are visible from the location of the apparatus or to duplicate an image taken from any compass heading and pitch reachable by the apparatus.

2 Claims, 8 Drawing Sheets

(56) References Cited

U.S. PATENT DOCUMENTS

| | | | | |
|---|---|---|---|---|
| 2012/0019681 | A1* | 1/2012 | Chen | H04M 1/72533 |
| | | | | 348/211.1 |
| 2013/0076726 | A1* | 3/2013 | Ferrara | G06T 11/00 |
| | | | | 345/418 |
| 2013/0083990 | A1* | 4/2013 | Stone | G06K 9/00208 |
| | | | | 382/141 |
| 2014/0362287 | A1* | 12/2014 | Chung | H04N 5/23238 |
| | | | | 348/376 |
| 2015/0098075 | A1* | 4/2015 | Bestler | G01C 15/002 |
| | | | | 356/3.01 |
| 2016/0035094 | A1* | 2/2016 | Kennedy | G06T 7/0042 |
| | | | | 382/100 |
| 2016/0343140 | A1* | 11/2016 | Ciprari | G06T 7/60 |

FOREIGN PATENT DOCUMENTS

| | | | | |
|---|---|---|---|---|
| JP | 2007325292 | A | * | 12/2007 |
| JP | 2009253659 | A | * | 10/2009 |
| JP | 2010231608 | A | * | 10/2010 |
| JP | 2013073561 | A | * | 4/2013 |

* cited by examiner

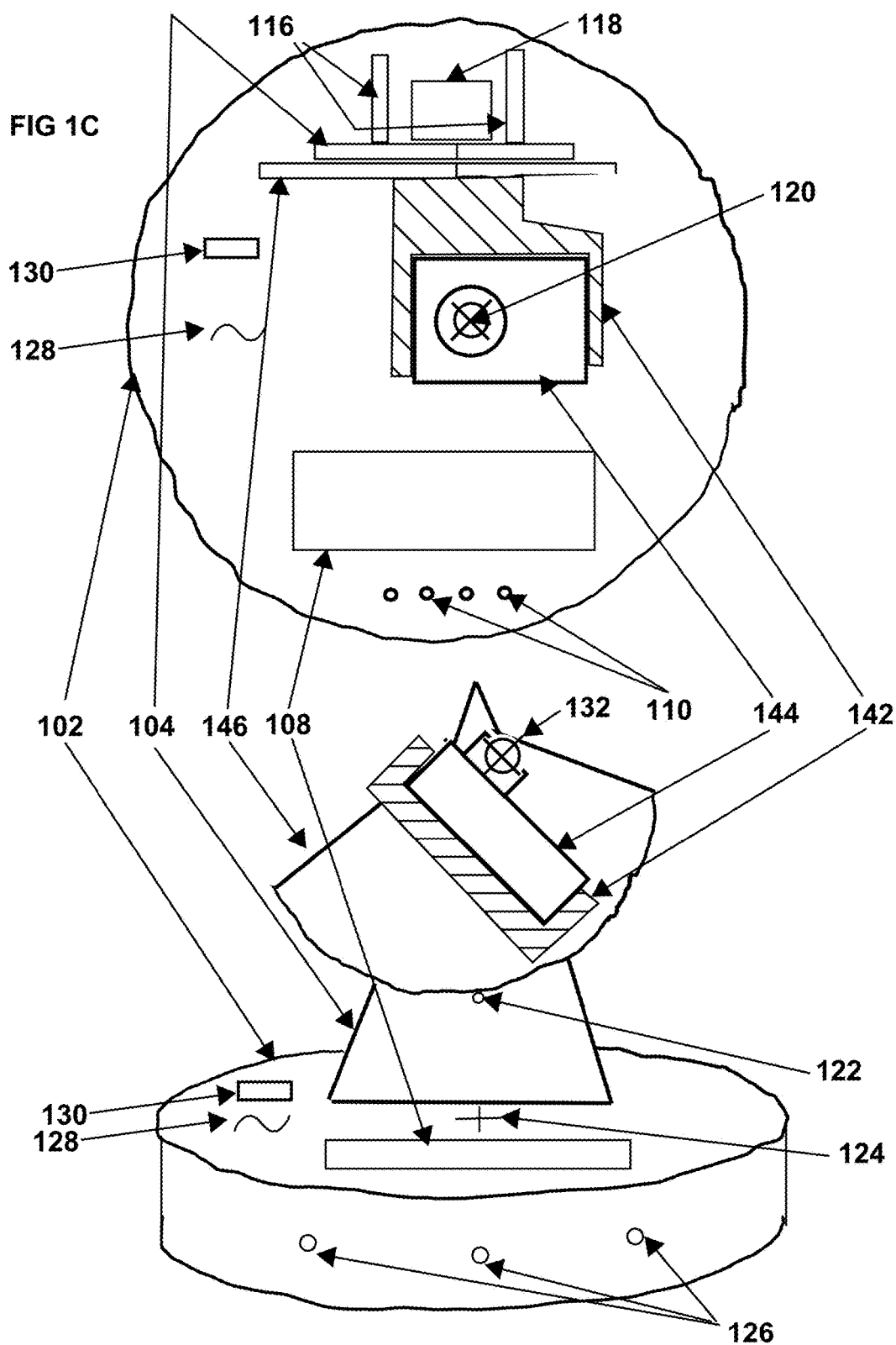

SYSTEM FOR GENERATING AND DISPLAYING DISCONTINUOUS TIME-LAPSE IMAGE SEQUENCES

GOVERNMENT FUNDING

None

RELATED APPLICATIONS

This application claims priority from U.S. provisional 62/005,832 filed May 30, 2014, the entirety of which is incorporated by reference as if fully set forth herein.

FIELD OF USE

This invention provides a system for generating high-quality discontinuous time-lapse image sequences by quickly and accurately positioning and re-positioning an imaging device. Discontinuous time-lapse image sequences contain images taken from the same perspective with irregular time-lapses that vary from seconds to years. Accurately positioning and repositioning an imaging device is necessary in order to economically generate high-quality discontinuous time-lapse images for use in a variety of applications.

BACKGROUND

U.S. Pat. No. 7,688,381—SYSTEM FOR ACCURATELY REPOSITIONING IMAGING DEVICES—VanBree—provides a system and method for accurately repositioning any imaging device in order to acquire or project images of a scene of interest generated at different times or with different modalities such as infra-red images, images from laser scanners or images of models of real-world objects. The image sequences generated by the method and apparatus described in the above referenced patent have been used for documentation of as-built conditions in construction projects, for documenting changes over time in real-estate holdings and art galleries, for showing growth and maturity of living plants in a variety of settings and for diagnosing and fixing various construction related issues. Enhancements to the utility of sequences of images generated by said techniques have been advanced in subsequent patents by the same author.

THE PROBLEM TO BE SOLVED

Documentation of as-built conditions within the built environment or changing conditions during construction projects relies heavily on a variety of photographic techniques. The system and method of the above referenced U.S. Pat. No. 7,688,381 provide one such technique used by a number of companies to provide as-built photographic documentation. The equipment used today to do this type of documentation is mostly off-the-shelf photographic equipment such as cameras, tripods and automatic pan heads in conjunction with various measuring devices such as steel tapes and laser measuring devices. Commercially available automatic pan heads in use today are typically designed to accommodate digital cameras weighing up to 14 pounds, and need to be set on a tripod capable of bearing the weight of the pan head in addition to that of the camera. The net result is that such equipment is bulky and not easy to carry around on a busy job-site. In addition it is time-consuming to set up and use. Reducing the weight of such equipment and the time required to use it will greatly expand the market for time-lapse image sequences in construction and facility management.

The advent of digital imaging devices weighing less than 8 ounces, such as smart phones equipped with digital cameras and light-weight high-resolution cameras, provides an alternative to using conventional off-the-shelf photographic equipment for doing as-built photographic documentation. Pan heads for use with imaging devices weighing less than 8 ounces do exist, but they lack two critical capabilities needed for easily creating discontinuous time-lapse image sequences. First, they have no built-in measurement capabilities to record the location of the attached digital imaging device and to re-locate the imaging device in order to re-take the photograph at a later time. Second, they do not allow the imaging device to be pointed in any combination of compass direction and pitch, herein defined as rotation around a horizontal axis that is perpendicular to the axis passing through the center of the lens of the imaging device, required to align images for use in time-lapse image sequences.

The current invention further simplifies the process of positioning and re-positioning an imaging device by using a variety of existing devices that were not readily available when the original patents were issued. People with little knowledge of the underlying technology can use the method and apparatus of the current invention to create images that further extend the functionality of image sequences.

SUMMARY OF THE INVENTION

The current invention provides a method and an apparatus for use with an existing imaging device weighing less than 8 ounces, such as a lightweight digital camera or a camera-equipped cell phone, in conjunction with the apparatus of the invention to locate and/or re-locate the imaging device relative to the built environment. In addition the method of this invention teaches an extension of the prior art of time-lapse imaging that allows for simple adjustments to the location of the imaging device to take into account changes in the built environment such as built-out of walls or addition of new features such as cabinetry or equipment that obscure views featured in previously generated reference images.

The apparatus of the current invention makes use of simple laser measurement technology that can quickly generate a profile of a feature that can be matched with other profiles of the same feature that were generated earlier using other techniques. This feature matching allows a user to confirm their location in a 3D environment and refine the position of the imaging device based on known construction techniques. Once the position of the imaging device is determined to an acceptable level of accuracy, a simple model can be constructed that allows precise matching of an image from an imaging device to a previously generated reference image.

In addition to improving the ease of image matching in the built environment, the apparatus of the current invention allows the rotation of the attached imaging device to capture a set of images that provide complete coverage of the items and features that are visible from the location of the apparatus.

The preferred embodiment of the inventive apparatus consists of an imaging device weighing less than 8 ounces attached to the apparatus by an adapter, such that the apparatus can position the imaging device through 360 degrees of compass heading and between 160 degrees and 180 degrees of pitch. The apparatus is capable of triggering the imaging device to capture an image from any position in which the apparatus has positioned the imaging device.

The preferred embodiment of the method comprises the steps of: selecting an imaging device weighing less than 8 ounces, attaching the imaging device to the apparatus of the invention using an adapter tailored for use with the imaging device, generating a profile of a feature of the built environment such as the interior of a room, scaling, rotating and aligning the profile with an existing map of the feature or with profiles of nearby features, determining if the alignment is acceptable and generating and storing a location model of the feature relative to the nearby built environment. After a time lapse of hours to years the apparatus is used to re-position the imaging device using the stored location model.

BRIEF DESCRIPTION OF THE DRAWINGS

FIGS. 1, A and B inclusive, where FIGS. 1A and 1B taken together show the components of an apparatus that holds an imaging device weighing less than 8 ounces along with simple laser measurement devices. The apparatus allows the imaging device to capture images through a full 360 degrees of compass heading and through 160 to 180 degrees of pitch.

FIGS. 1, C and D inclusive, shows a top view, FIG. 1C, and a side view, FIG. 1D, of the apparatus described in this invention. FIGS. 1 C and D holds a different imaging device weighing less than 8 ounces than the imaging device that is held in FIGS. 1 A and B.

FIGS. 3 D and E show steps in generating a location model.

FIGS. 3 F and G show the generation of a location model in cases where the built environment differs from an idealized environment of flat surfaces.

FIGS. 3 H and J show the use of current and stored location models to return the apparatus of this invention to the same spot despite significant differences within the built environment where the apparatus was originally used to capture images.

DETAILED DESCRIPTION OF A PREFERRED EMBODIMENT OF THE INVENTION

Figures 1A, 1B:
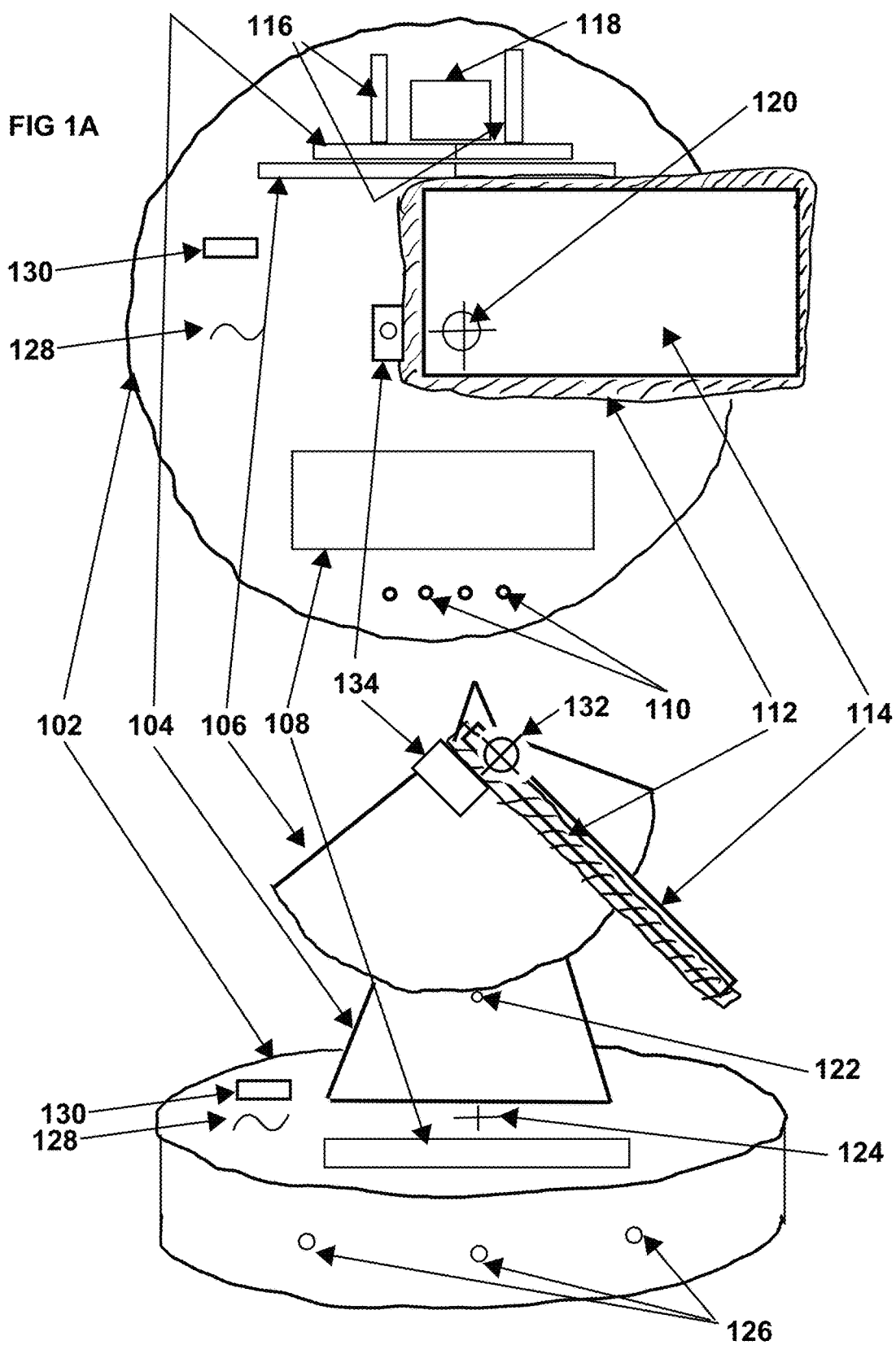
FIG. 1A shows a top view and FIG. 1B shows a side view of the apparatus described in this invention.

FIG. 1 is an overview of the components of one embodiment of an apparatus that can be used within the system for generating and displaying discontinuous time-lapse image sequences. The base marked (102) is a housing for the motors, batteries and electronics that are part of the system. The base (102) is designed is such a way that it can rotate around a vertical axis that is centered at the cross, shown as (124).

Component (112) is a holder designed to hold an imaging device that is represented by component (114). The target symbol (120) on the imaging device (114) indicates the center of the lens of the imaging device. The lens center (120) aligns vertically with the apparatus center (124) in order to allow the apparatus of FIGS. 1 A and B to rotate the imaging device around its lens center. Components (112) and (106) are specific to the imaging device (114) and will differ depending on which imaging device is chosen for use in the apparatus.

The imaging device holder (112) is attached to a revolving plate (106) that is attached to a vertical bracket (104). The vertical bracket (104) holds both the revolving plate (106) and the imaging device holder (112) in an upright position so that the motor (118) can drive the revolving plate (106) with the use of a gear (122) that is attached to the motor.)

By driving the revolving plate (106) the apparatus can rotate the imaging device (114) around a horizontal axis (132) that passes through the lens center of the imaging device. The combination of rotation around the vertical axis (124) to select a compass direction and rotation around the horizontal axis (132) to select a pitch allows the imaging device to capture images through a nearly complete sphere centered at the lens center of said imaging device.

In an alternate embodiment of the apparatus an auxiliary wide angle or telephoto lens attached either to the imaging device (114) or the device holder (112) extends the capabilities of the imaging device (114).

The attachment of the device holder (112) and the rotating plate (106) to the vertical bracket (104) involves assembly of adapters that will accommodate various configurations of imaging devices. For example there is one combination of device holder (112) and rotating plate (106) for an iPhone, another for an Android phone and a different combination for a small camera such as a 12 mega pixel Canon PowerShot N. Components (116) are stiffening supports for the vertical bracket (104). In addition, stiffeners (116) protect the motor (118) that protrudes from the back of the vertical bracket.

The electronics contained within the base (102) consists of a micro-controller capable of doing general computations, driving stepper motors such as (118) and communicating with the imaging device and other devices through wired or wireless communication channels.

Component (128) indicates a wireless communication capability such as Bluetooth or WiFi for communicating with nearby devices. Component (130) indicates a wired communication capability such as USB or Thunderbolt.

The user interacts with the processor or micro-controller contained within the base unit (102) through a display panel (108) and a set of input keys (110). The components (126) indicate one or more laser measuring devices that are housed in or attached to the base unit.

In the preferred embodiment a laser measuring device (134) is attached to the rotating plate (106) or the device holder (112) and is used for taking measurements through a vertical arc.

FIGS. 1C and 1D taken together show the top view, FIG. 1C, and the side view, FIG. 1D, of the apparatus with a different imaging device weighing less than 8 ounces (144). Components (142) the imaging device holder, and (146) the rotating plate, are designed specifically to accommodate the imaging device (144). Taken together components (142) and (146) adapt the apparatus of FIGS. 1C and 1D to use the imaging device (144) in the same way that components (112) and (106) adapt the apparatus of FIGS. 1A and 1B to use the imaging device (114).

Figure 2:
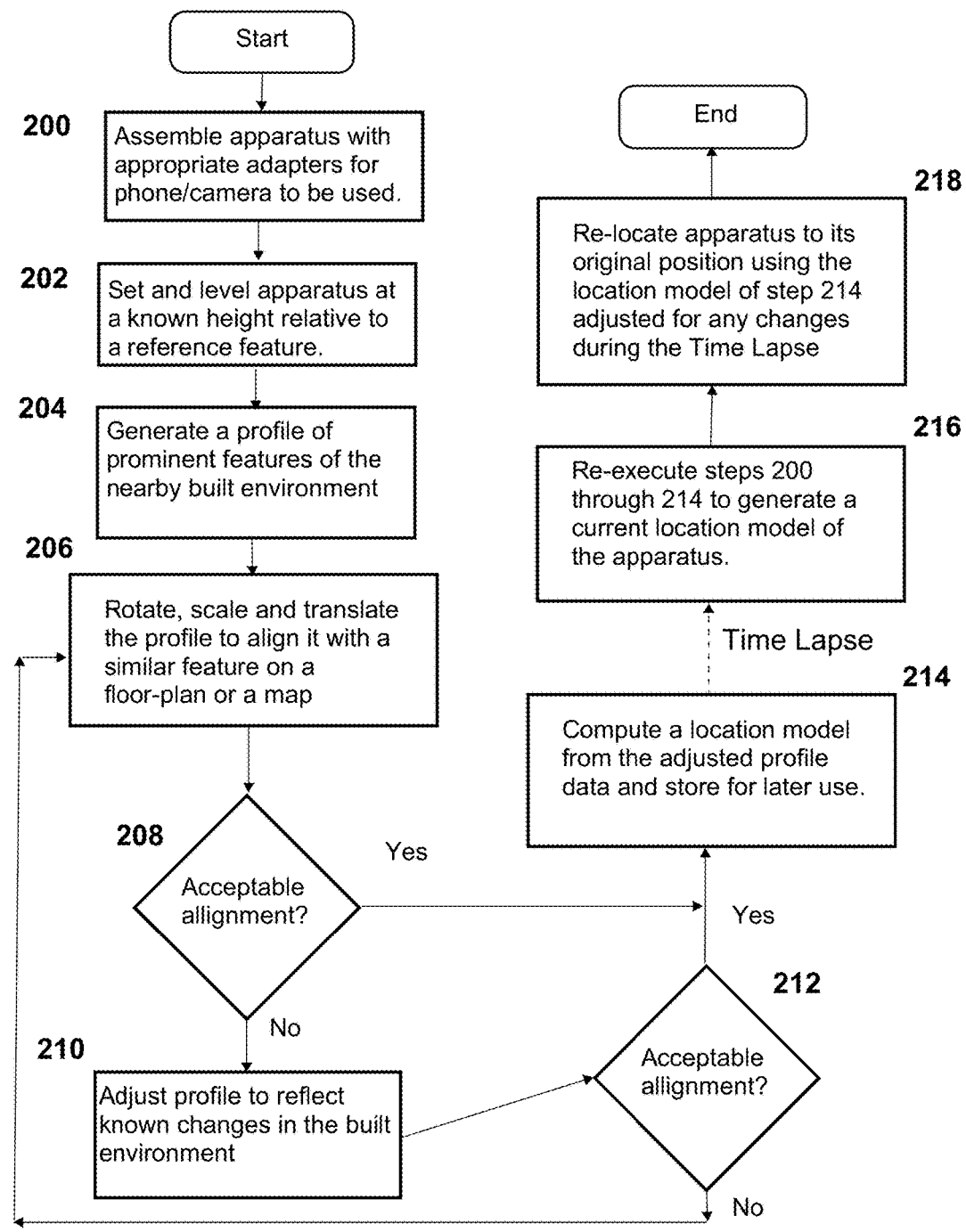
FIG. 2 is a process by which the apparatus shown in FIG. 1 is used to precisely locate an imaging device relative to known features in the built environment.

FIG. 2 is a generalized flowchart for the steps performed to use the apparatus shown in FIG. 1 to generate discontinuous time-lapse image sequences. The first step shown in box 200 is assembly of the proper set of components to attach the pre-selected imaging device to the base (102) of the apparatus shown in FIG. 1.

The next step shown in box 202 is to set the apparatus at a known height relative to a reference level within the built environment such as a finished floor and to level the base (102) of the apparatus using a leveling display on the display panel (108 on FIG. 1) or by using a simple bubble level. By leveling the apparatus at a known height four of the six degrees of freedom that the imaging device (114 in FIGS. 1A and 1B or 144 in FIGS. 1C and 1D) can move through are constrained by the X, Y, and Z positions of the base unit and the orientation of the apparatus's vertical axis (124 in FIG. 1). This leaves only two degrees of freedom in which the imaging device is moved by the apparatus. One degree of freedom is defined by the vertical axes of the apparatus (124) and allows the imaging device to be pointed in any compass direction. The second degree of freedom is defined by the horizontal axis (132) and allows the imaging device to rotate through 160 to 180 degrees of pitch.

The next step detailed in box 204 is to generate a profile of nearby features using the laser measuring devices (126 and/or 134 in FIG. 1). To accomplish step 204 the apparatus is rotated around its vertical and/or horizontal axis while taking periodic laser measurement data. A sample of the data generated is given in FIG. 3A and will be discussed further in the detailed description of that figure. The profile generated in step 204 can be transferred to a nearby device using the apparatus's wireless communication capability or it can be displayed on the built in display (108 in FIG. 1) where it can be compared to known features displayed on a map of the area that is being used as a reference.

Figure 3A:
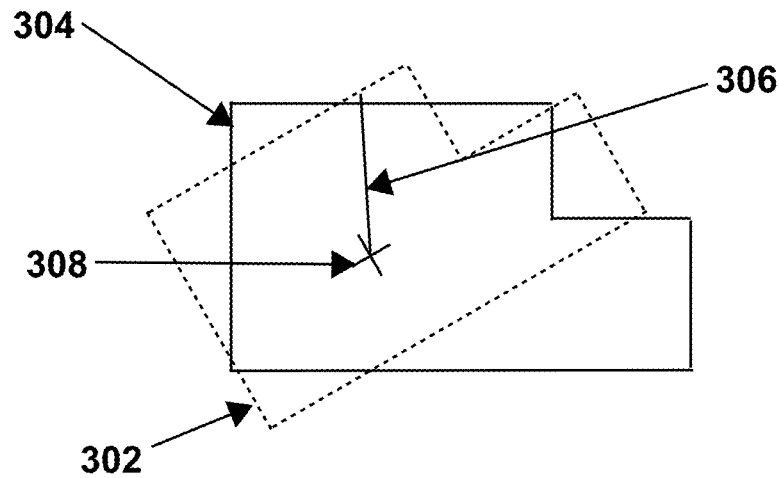
FIG. 3 A through C shows a sequence of diagrams that illustrates the generation and alignment of a profile with a similar feature on a floor-plan or map.
Figure 3B:
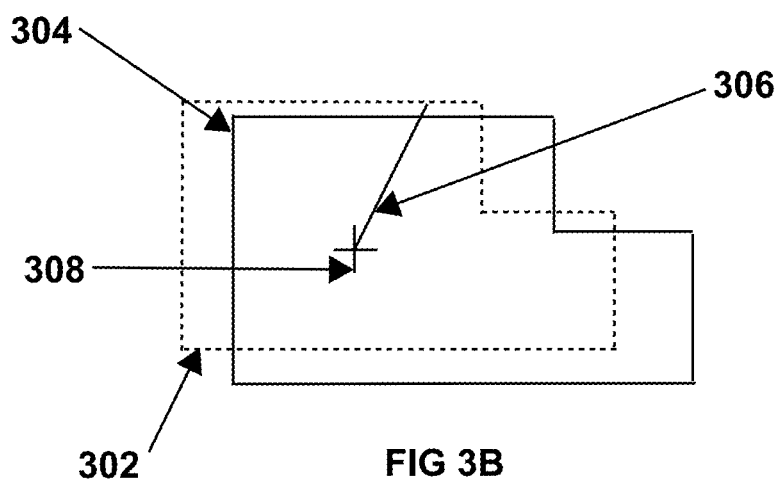
Figure 3C:
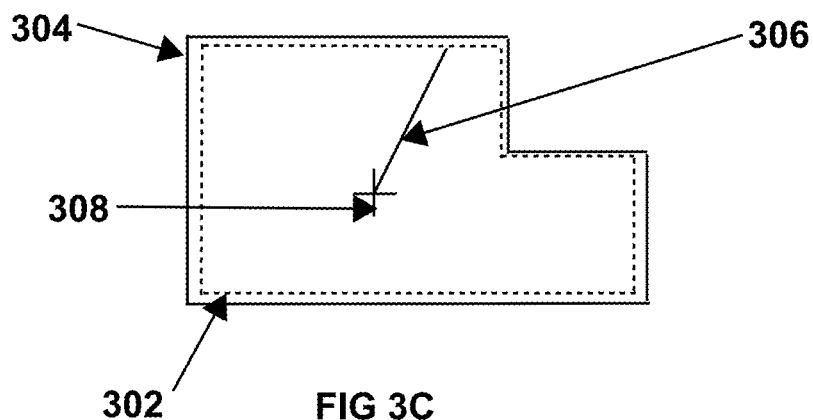

Step 206 shows what to do if the profile generated in step 204 is rotated or translated relative to the floor plan or map on which it is displayed. At this point in the process the alignment between the generated profile and the known floor plan or map features may be good enough to proceed to box 214. Step 206 is illustrated in FIG. 3A through 3C.

If the alignment between features is not acceptable because of changes in the nearby built environment, the user executes the process described in Box 210 and checks the alignment again in box 212. Adjustments to changes in the build environment are illustrated in FIGS. 3 F and G.

If one pass through box 21U generates an acceptable alignment then the process continues with box 214. If more adjustment is needed the process returns to box 206 and goes through the adjustment cycle again.

Once an acceptable alignment between the profile generated in box 204 and the corresponding feature in the built environment has been achieved, the process continues with box 214 where a location model is distilled from the measurement data contained in the adjusted profile and stored for later use.

After a time lapse of indefinite length the apparatus can be returned to the same location within the built environment by using step 216 to determine the current location model of the apparatus. This location model will be used in step 218 to return the apparatus to the location that was computed prior to the time lapse that occurred between steps 214 and 216.

Figure 3D:
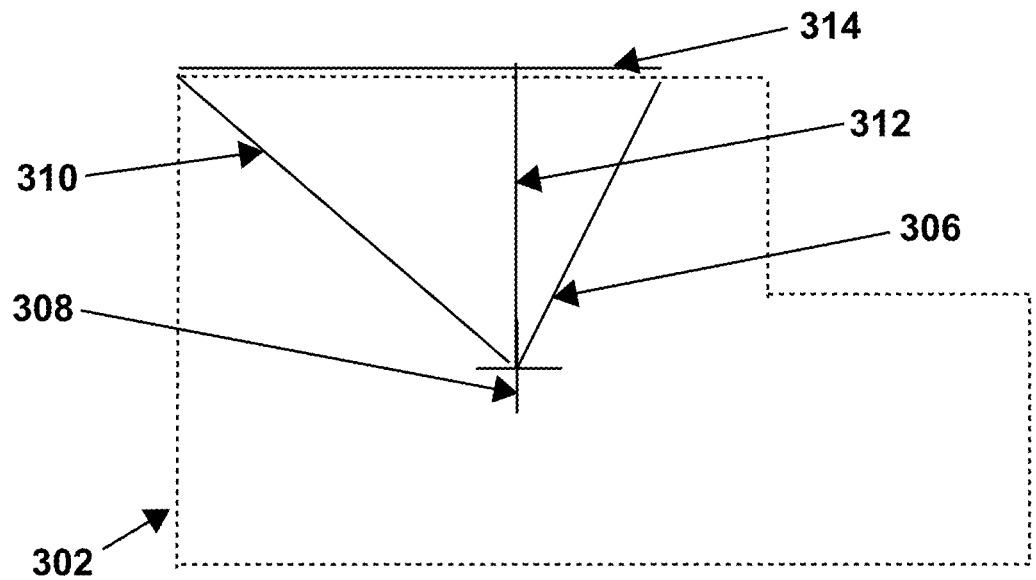

Step 218 re-locates the apparatus to its original position by using the original location model and the current location model as guides. This process is illustrated in FIGS. 3H and 3J.

Upon executing the process of FIG. 2 for the first time at a given location, a user can use the apparatus of FIG. 1 to take a sequence of images that can be stored along with the location model generated in step 214. If this is not the first time capturing images and measurements at the location determined in step 214 then the stored location model is used to re-locate the apparatus and go through steps 204-214 to verify that the prominent features of the nearby built environment haven't changed and that re-taking a series of images and measurements will provide useful data that shows the changes in the nearby built environment over the period of time that has elapsed since the last image data was generated.

FIG. 3 shows a simple example of the kind of data that would be generated and displayed while executing the steps in FIG. 2.

In FIG. 3A a map or floor-plan of a single L-shaped room is shown as the solid outline 304. This is referred to in the description of FIG. 2 as a prominent feature of the nearby built environment. The room is much simplified in that it doesn't have any doors or windows that would normally be displayed on a floor-plan or map. Feature 302 is a profile that has been generated and overlaid on the floor-plan containing feature (304). The generated profile (302) is also simplified and doesn't show any features like doors and windows. In addition, if the profile were generated during construction and the studs were open, the profile would not consist of smooth lines but would instead show stud faces, stud sides, and components in areas that were visible outside the L-shaped room at the height that the laser measurements were taken.

In FIG. 3A the profile (302) is shown rotated and translated with respect to the feature (304). The cross at (308) represents the location within the profile (302) where the apparatus of FIG. 1 was located when the process of FIG. 2 step 204 was used to generate the profile (302). Line 306 represents the starting line or the direction and distance from the center of the apparatus to the nearby feature of the built environment. This direction will be used in a later step to determine the location model. The profile consists of components (302, 306 and 308) and all three components move and rotate as a single unit.

In FIG. 3B the profile has been rotated around its axis at (308) and more closely aligns with (304) the map or floor-plan representation of the nearby feature of the built environment. FIG. 3C shows the components of the profile translated after the rotation of FIG. 3B to more closely align with the representation of the L shaped room (304). If the alignment between the feature (304) and its corresponding profile (302) is good enough as judged by the test in FIG. 2 step 208 then FIG. 3C represents the output of the processes in FIG. 2 steps 202 through 212 that provides the input to FIG. 2 step 214.

The user of the apparatus must judge if the alignment in FIG. 3C is acceptable based on their knowledge of construction details. For instance the walls in the L-shaped room could have been built out by adding a layer of wallboard or the floor plan representation of the room could show only the centerline of the walls. Either of these cases would cause the representation of the L shaped room (304) to differ from the profile that is generated by the apparatus (302). User knowledge of construction changes during the time lapse between steps 214 and 216 improves the judgment required in steps 208 and 212 of FIG. 2.

Assuming that the alignment shown in FIG. 3C is acceptable the corresponding profile (302) can be used to generate a location model. FIG. 3D details the elements that are generated as part of the location model. Elements (302, 306 and 308) constitute the profile that has been generated, and elements (310, 312 and 314) are measurements that are generated and stored as part of the location model. Line 310 in FIG. 3D is the distance from the apparatus's location (308) to the upper left corner of the L-shaped room. Line 310 is called the Left Reference Line. Line 314 is the distance from the upper left corner of the room to the point where the starting line for the laser measurements (306) intersects the reference wall. Line 314 is called the Wall Line. Line 312 is the perpendicular distance from the apparatus's location (308 to the wall line or reference wall shown as the uppermost horizontal line of the profile (302). Line 312 is called the Perpendicular Line. The three lines (310, 312, and 314) form a right triangle with one leg that may extend past the perpendicular line (312) to meet the starting line (306).

In an alternate embodiment of the invention lines (310, 314 and 306) which also form a triangle, are used to create a location model. The right triangle used in the preferred embodiment simplifies the computation of a location model but is not always possible to obtain.

Figure 3E:
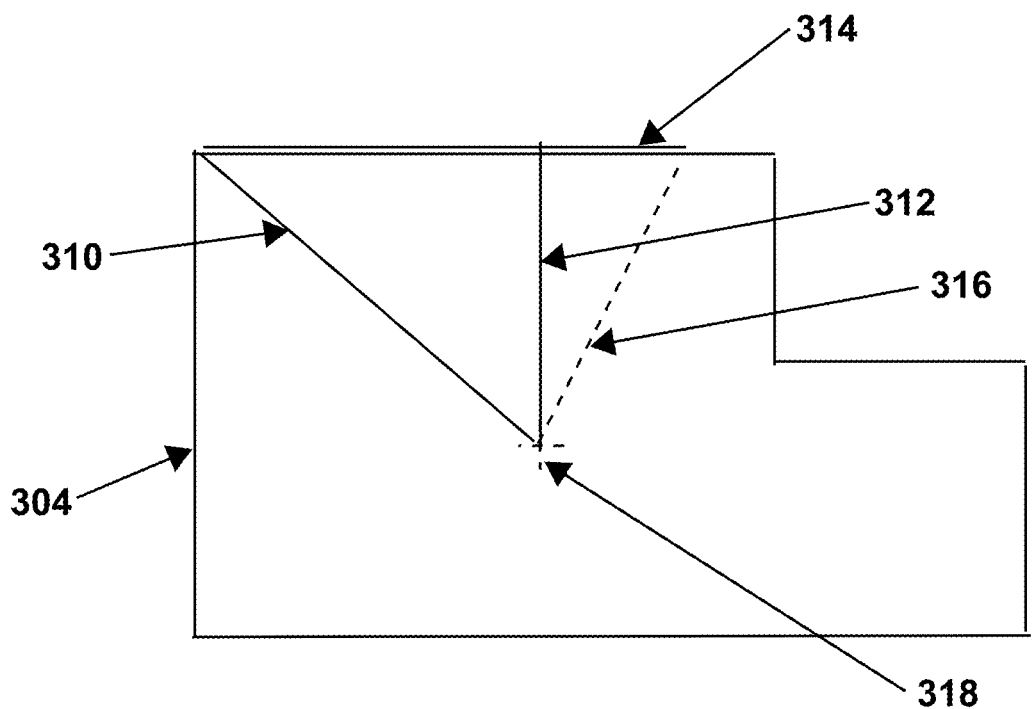

In FIG. 3E the location model consisting of lines (310, 312 and 314) has been used to re-locate the apparatus at the position indicated by the dashed cross at (318). To generate a time-lapse image sequence that overlays a previous sequence taken from position 318 the first image or measurement should be taken in the original starting direction (316) that can easily be found by extending a line from position 318 to the end of line 314. For the images to overlay properly, the parameters used to generate the previous series of images should be used to guide the image acquisition sequence used by the apparatus of FIG. 1. Parameters such as the focal length of the lens, number of shots taken to cover a 360 degree field of view and number of rows of images required to generate complete spherical image coverage are among the types of data that should be stored as part of any image sequence selected for use as part of a time-lapse image sequence.

Figure 3F:
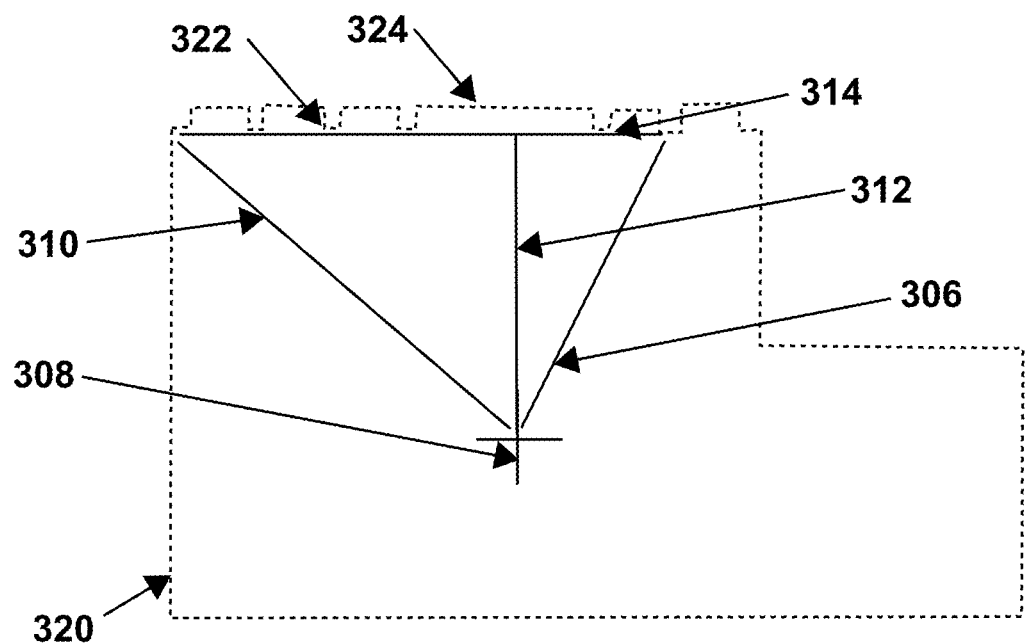
Figure 3G:
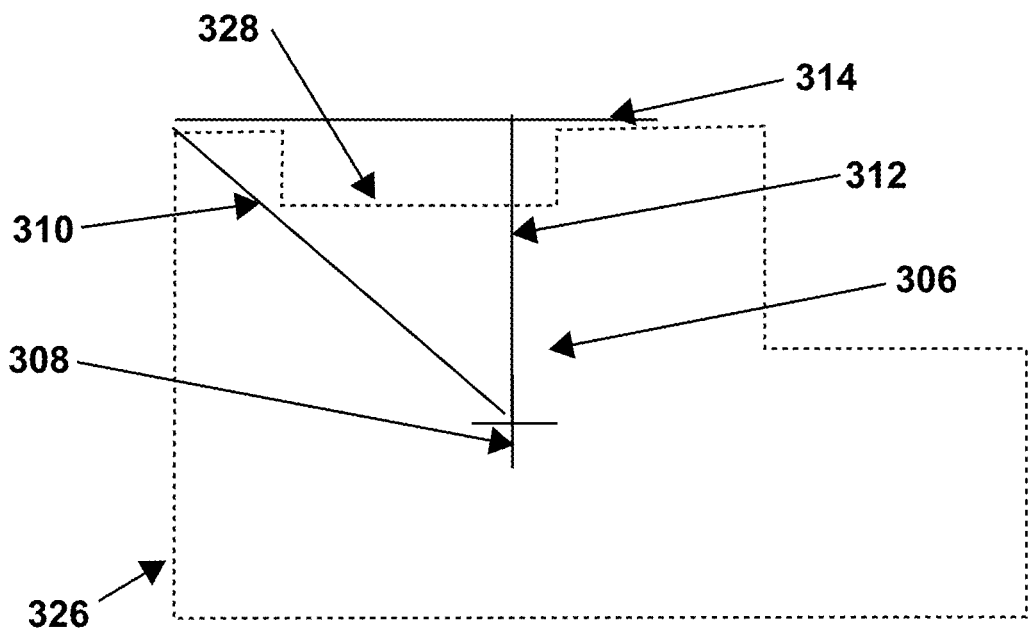
Figure 3H:
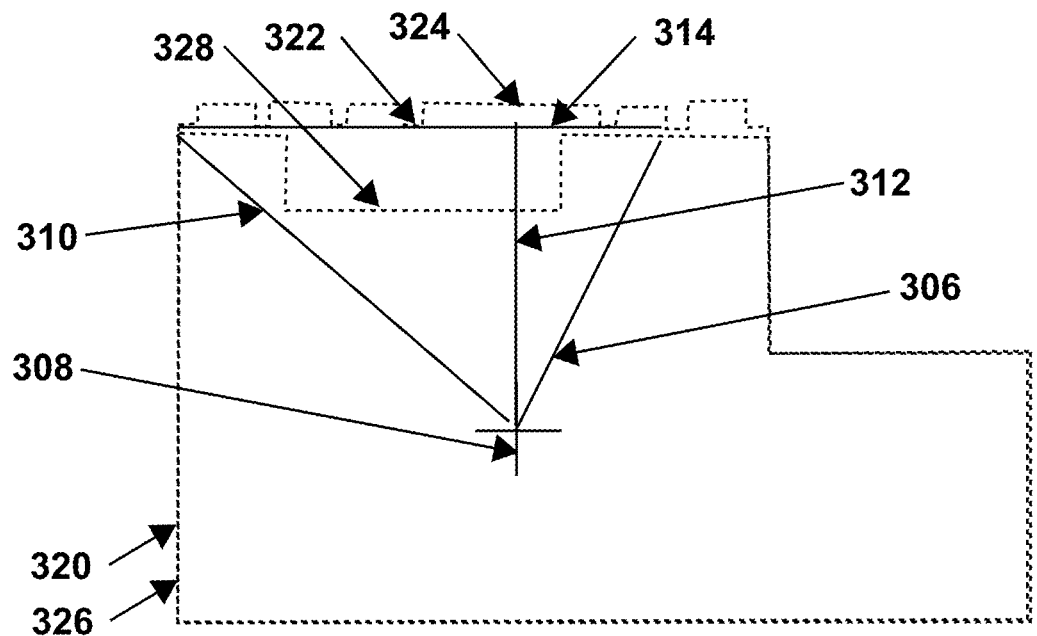
Figure 3J:
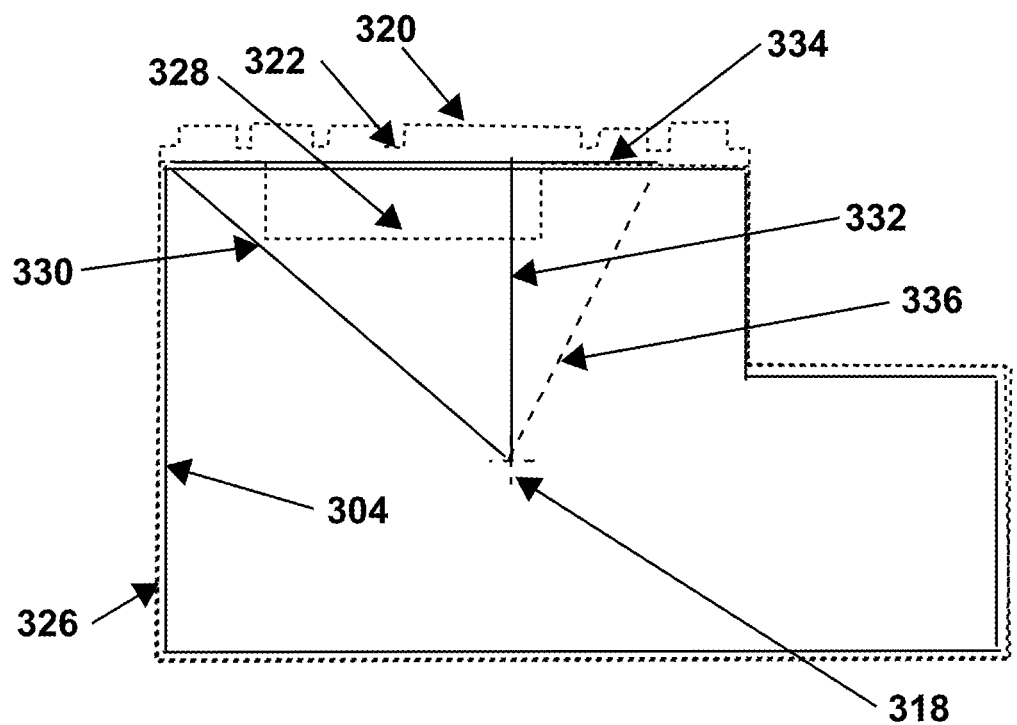

FIGS. 3F and 3G shows generation of a location model in cases where the built environment differs from an idealized environment of flat surfaces.

In FIG. 3F profile 320 shows open studs along the North (upper) wall of the L shaped room. (322) points to a portion of profile (320) that represents the front face of a wall stud. (324) points to cladding at the back of the stud wall which could be exterior sheeting or wall board on a room to the North of the L shaped room of profile (320). In this case the location model line (314) should be aligned with the front of the studs as shown rather than aligning with the sheeting on the rear face of the studs. Front and rear faces of the studs are labeled from the prospective of a viewer standing at point (308) and looking North or up on the floor-plan or map.

FIG. 3G shows profile (326) of the L shaped room in which a cabinet has been attached to the North wall. The cabinet shows up in profile (326) as a bump-out labeled as (328). In this case the wall line (314) is placed so that it aligns with the parts of the profile (326) that represent the North wall of the L shaped room rather than the front of the cabinet represented by (328). The perpendicular line (312) is extended beyond the cabinet bump-out (328) to the wall line (314). The resulting location model (310, 312 and 314) can be used to relocate the imaging device so that the images it captures will overlay images taken prior to the cabinet, represented by bump-out (328) being placed on the North wall of the room.

FIGS. 3H and 3J show the use of current and stored location models to return the apparatus of this invention to the same spot despite significant differences within the built environment where the apparatus was originally used to capture images. In FIG. 3H two profiles (320 and 326) have been overlaid. Profile (320) was generated when the studs were open on the North wall. Feature (322) represents the front of the stud wall and feature (324) represents the rear of the studs of profile (320). Profile (326) overlies profile (320) everywhere except the North wall of the L shaped room. Feature (328) represents a cabinet that was placed against the North wall after the open studs were enclosed with wallboard.

FIG. 3H contains a location model consisting of lines (310, 314 and 312) that was generated and stored when the studs were open as described in FIG. 3F and corresponds to the location model stored in step 214 of FIG. 2. FIG. 3J contains a current location model consisting of lines (330, 334 and 332). The location model of FIG. 3J was calculated in the finished room after the cabinet represented by bump-out (238) was placed along the North wall of the L shaped room.

The location model of FIG. 3J consisting of lines (330, 334 and 332) is first calculated as described in step 216 of FIG. 2. It is adjusted for changes during the Time Lapse between steps 214 and 216 of FIG. 2. This requires that the perpendicular line, feature 332, be adjusted to account for the thickness of the wall board and wall coverings that were placed on the North wall of the L shaped room after the location model of FIG. 3H was calculated and stored. Wallboard applied to the open studs on the North Wall of the L shaped room has a thickness of ⅝". To complete step 218 of FIG. 2 the perpendicular distance, 332 in FIG. 3J, has been shortened by ⅝" from the perpendicular distance (312) that was stored in the location model of FIG. 3H. This adjustment takes into account changes that occurred during the Time Lapse between steps 214 and 216 of FIG. 2.

Figure 4:
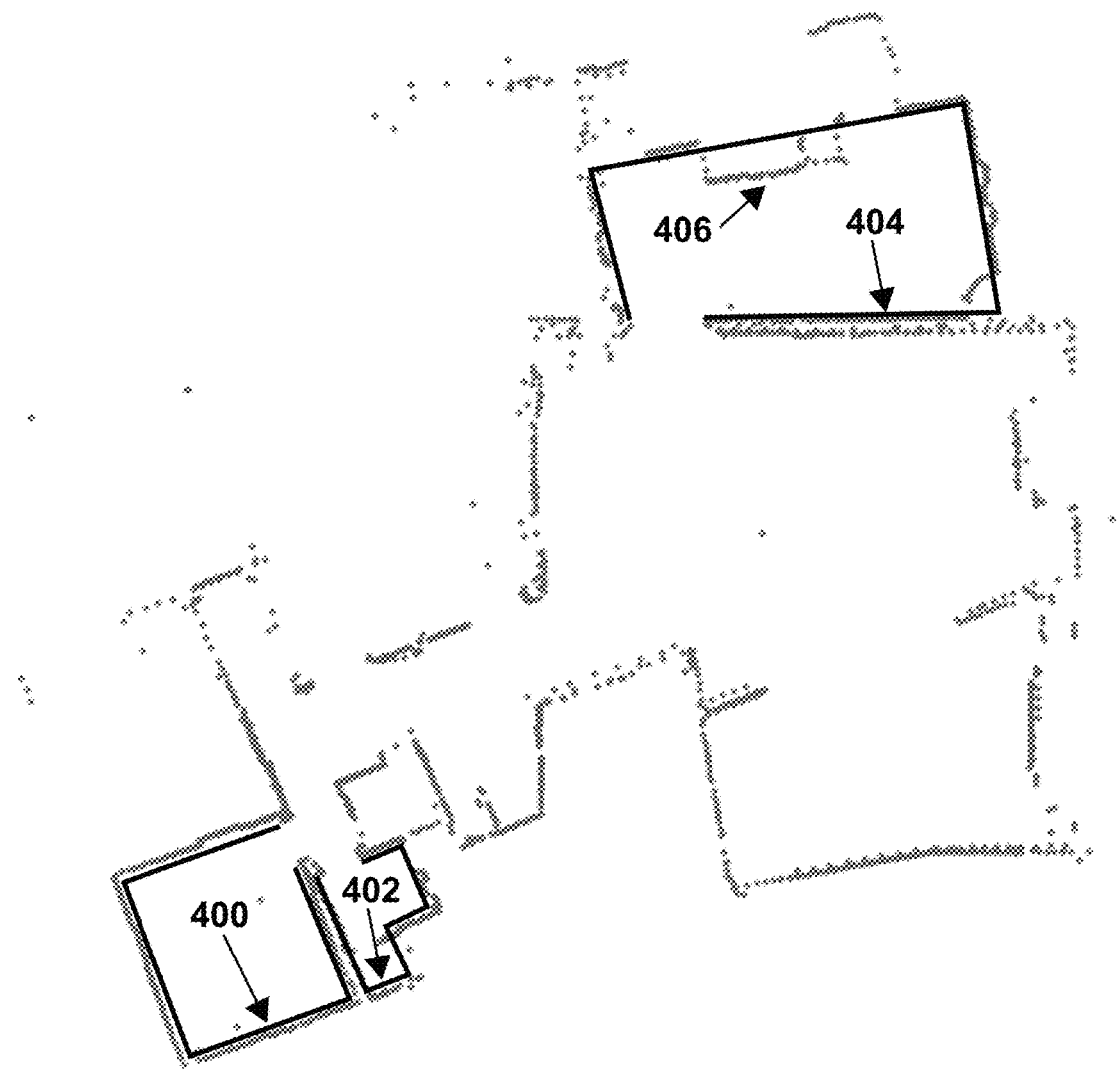
FIG. 4 shows a number of profiles that have been rotated, aligned and combined to form a floor-plan or map without the use of a reference floor-plan.

In FIG. 4 a prototype of the apparatus in FIG. 1 has been used to generate a profile similar to item 302 in FIG. 3 for multiple rooms in a building. The profiles have been rotated, translated, and assembled into an overall floor-plan of the building. Polyline 400 in FIG. 4 inscribes a small rectangular room with a doorway on the upper right hand side. Polyline 402 in FIG. 4 inscribes a small bathroom with a door on the left upper side. Polyline 404 in FIG. 4 inscribes an irregularly shaped kitchen with a door on the lower left side. Feature 406 in FIG. 4 shows a bump-out in the profile that represents a cabinet placed along the upper wall of the kitchen represented by (404). This cabinet bump-out is similar to the one shown in FIG. 3G. The individual rooms such as (400, 402 and 404) are rotated and aligned such that they generate an overall floor-plan of the existing structure.

It can be appreciated that the inventive apparatus and method have many uses other than those set forth herein. The scope of the invention, therefore, is not limited to the examples set forth, but intended to extend to the claims supported by the instant specification and drawings provided herein.

What is claimed is:
1. A method comprising the steps of:
  selecting a device to acquire images, hereafter denominated as "imaging device", where said imaging device weighs less than eight ounces;
  assembling a base apparatus, together with said imaging device into an assembled apparatus, where said assembled apparatus includes an adapter to couple said imaging device to said base apparatus;
  generating, using said assembled apparatus, a profile of prominent features of a pre-selected nearby built environment;

scaling, rotating and translating said profile to align said profile with a similar feature on a representation of the location of said built environment;

determining the alignment of said profile relative to said feature on said representation, and, if unacceptable, repeat scaling, rotating and translating until alignment is acceptable;

computing a location model from adjusted profile data, storing said location model;

relocating said assembled apparatus to the position indicated by said location model; and retaking a photograph for use in a discontinuous time-lapse image sequence.

2. An apparatus comprising:

an imaging device, coupled to the apparatus by means of an imaging device adapter, said apparatus comprising:

a base (102) designed in such a way that it can rotate around a vertical axis that is centered at an apparatus center (124) and housing motors, batteries and electronics, including a micro-controller capable of performing general computations, driving a stepper motors (118) and communicating with said imaging device and other devices through wired or wireless communication channels and laser measuring devices (126) and (134) where the laser measuring devices (126) are attached to the base for taking measurements through a horizontal arc and the laser measuring devices (134) are attached to a rotating plate (106) for taking measurements through a vertical arc;

said imaging device adapter (112) designed to hold the imaging device where the imaging device weighs less than eight ounces, so that a lens center (120) on the imaging device aligns vertically with the apparatus center (124) in order to allow the apparatus to rotate around the lens center (120) of the imaging device component (114);

said imaging device adapter (112) attached to a revolving the rotating plate, (106) that is attached to a vertical bracket (104) said vertical bracket positioning the rotating plate (106) and said imaging device adapter (112) in an upright position so that the stepper motor (118) drives said revolving the rotating plate with the use of a gear (122) that is attached to the stepper motor (118) so that by driving the revolving plate (106) said imaging device (114) rotates around a horizontal axis (132) that passes through the lens center of the imaging device, such that the combination of rotation around the apparatus center (124) and the horizontal axis (132) allows the imaging device to capture or re-capture images in any direction and pitch centered at the lens center of the imaging device.

* * * * *